(12) United States Patent
Robinson

(10) Patent No.: US 6,616,217 B1
(45) Date of Patent: Sep. 9, 2003

(54) VEHICLE PILLAR SYSTEM

(75) Inventor: Daniel Adrian Robinson, Ballymena (GB)

(73) Assignee: Expotech Limited, Ballymena (GB)

( * ) Notice: Subject to any disclaimer, the term of this patent is extended or adjusted under 35 U.S.C. 154(b) by 0 days.

(21) Appl. No.: 09/958,223

(22) PCT Filed: Apr. 4, 2000

(86) PCT No.: PCT/GB00/01264
§ 371 (c)(1),
(2), (4) Date: Oct. 5, 2001

(87) PCT Pub. No.: WO00/59768
PCT Pub. Date: Oct. 12, 2000

(30) Foreign Application Priority Data

Apr. 6, 1999 (GB) .............................................. 9907597

(51) Int. Cl.[7] .............................................. B60R 27/00
(52) U.S. Cl. .................... 296/178; 296/29; 296/203.01; 105/397
(58) Field of Search ................................ 296/178, 187, 296/193, 203.01, 29, 30; 105/397, 399, 400, 401

(56) References Cited

U.S. PATENT DOCUMENTS

| | | | | |
|---|---|---|---|---|
| 1,522,477 A | * | 1/1925 | Austin | 296/29 |
| 1,609,850 A | * | 12/1926 | Weymann | 296/203.01 |
| 1,694,572 A | * | 12/1928 | Weymann | 296/203.01 |
| 1,744,849 A | * | 1/1930 | Weymann | 296/187 |
| 1,828,743 A | * | 10/1931 | Lovell | 296/203.01 |
| 1,868,263 A | * | 7/1932 | Weymann | 296/203.01 |
| 1,953,991 A | * | 4/1934 | Schjolin | 296/178 |
| 1,958,234 A | * | 5/1934 | Cleveland | 296/178 |
| 1,960,196 A | * | 5/1934 | Robinson | 296/187 |
| 3,827,137 A | * | 8/1974 | Schubach | 296/178 |
| 3,881,765 A | * | 5/1975 | Cerra et al. | 105/401 |
| 3,981,107 A | * | 9/1976 | Schubach | 296/178 |
| 3,989,562 A | * | 11/1976 | Hladik et al. | 156/173 |
| 4,059,303 A | * | 11/1977 | Mauri | 296/187 |
| 4,069,638 A | * | 1/1978 | Hasselqvist et al. | 52/726.2 |
| 4,230,361 A | | 10/1980 | Nachbur et al. | 296/193 |
| 4,274,190 A | * | 6/1981 | Slattery | 296/178 |
| 4,462,629 A | * | 7/1984 | Todori et al. | 296/187 |
| 5,116,161 A | * | 5/1992 | Faisst | 296/29 |
| 6,257,652 B1 | * | 7/2001 | Stanton | 296/178 |

FOREIGN PATENT DOCUMENTS

| | | |
|---|---|---|
| EP | 0 237 859 A1 | 9/1987 |
| EP | 0 302 017 B1 | 2/1989 |
| GB | 2 007 324 A | 5/1979 |

* cited by examiner

*Primary Examiner*—D. Glenn Dayoan
*Assistant Examiner*—Lori L Coletta
(74) *Attorney, Agent, or Firm*—Drinker Biddle & Reath LLP

(57) ABSTRACT

A vehicle frame system structure having one or more wholly or substantially vertical pillars, and one or more wholly or substantially horizontal inter-connected struts, wherein the bottom section of at least one of the vertical pillars is separable from the remaining section of that pillar is described. By having separable bottom sections, the bottom sections of such pillars, which are the sections of pillars which are most commonly damaged and need repair, can be quickly and easily replaced. The need for major surgery to the whole frame structure is therefore avoided.

6 Claims, 2 Drawing Sheets

VEHICLE PILLAR SYSTEM

This application is the U.S. national phase application of PCT International Application No. PCT/GB00/01264 filed Apr. 4, 2000.

1. Field of the Invention

This invention relates to a repairable vehicle pillar system, particularly but not exclusively for use with passenger service vehicles such as buses.

2. Description of the Related Art

The frame structures (or "superstructures" or "bodies") of passenger service vehicles such as buses are presently formed from the welding of a series of vertical pillars with intermediate horizontal struts or stringers. The outer panels are then attached to this frame structure. Currently, all pillars used in such structures extend down the complete length of the structure. However, in the everyday traffic environment that buses work in, the bottom level of panelling on buses and the like has become a major area for frequent repairs. This is the level of most car bumpers.

Presently, when a pillar becomes damaged, there are only two options available for its repair. Either the complete damaged pillar can be replaced, or the damaged part of the pillar is locally replaced. However, each of these methods incur their own problems. To change a complete pillar, approximately two man days are required. The cost of this and the cost of the down-time for the bus can be significant. Replacing the local damaged part of a pillar only is usually quicker, but a welded repair requires specialist training. Moreover, if aluminium is concerned, and many bus pillars are made from aluminium, specialist equipment is also required. Welded repairs also suffer from poor strength characteristics in comparison to a full length pillar.

BRIEF SUMMARY OF THE INVENTION

It is an object of the present invention to provide a frame structure which is substantially quicker and easier to repair.

Thus, according to one aspect of the present invention, there is provided a vehicle frame structure having one or more wholly or substantially vertical pillars, and one or more wholly or substantially horizontal inter-connected struts, wherein the bottom section of at least one of the vertical pillars is separable from the remaining section of that pillar.

By being separable bottom sections, the bottom sections of such pillars, which are the sections of pillars which are most commonly damaged and need repair, can be quickly and easily replaced. Thus there is no need for major surgery to the whole frame structure.

Each bottom section of a pillar which is separable is separable in terms of being removably securable. The bottom section could be securable either to the remaining section of the pillar, to one or more horizontal struts, or to both. The bottom section could be removably secured using any suitable securing or fastening means, such as nuts and bolts. Each separable bottom section could be securable directly to the remaining part of the frame structure, or through one or more intermediate securing means such as plates, brackets, toggles, packer bars, flat bars, etc.

Preferably, the separable bottom section of the pillar extends from or near from the level of the lowest horizontal strut or struts. Each horizontal strut used in the frame structure could be continuous across the vertical pillars, or intermediate between the vertical pillars. A vehicle frame structure of the present invention could involve both forms of horizontal struts.

The separable bottom section may or may not be aligned with a vehicle pillar. Thus, the separable bottom sections may be positioned to suit other arrangements for the frame structure, e.g. wheel is arch positions. It would also allow a 'standardized' frame structure or body to fit various different chassis.

According to one embodiment of the present invention, the frame structure includes one or more non-sectioned or continuous vertical pillars, in order to maintain its overall shape and/or its overall strength.

The frame structure of the present invention is applicable to any vehicle having one or more frame structures, upon which outer facings or panels are then attached. It is particularly suitable for passenger service vehicles such as buses, and especially the side frame structures of such vehicles.

It is also suitable for vehicles not having a conventional strong chassis that can easily be manipulated without affecting the overall strength and payload, e.g. the frame structure of so-called low floor buses, and similar passenger services vehicles. Chassis for such vehicles involve a weaker and more flexible mid-section, and so require the frame structure or body to be stronger. It was previously thought that to maintain strong body strength, continuous vertical pillars were still required. However the present invention has been found suitable for such buses, by ensuring strong conjunction of the separable pillars with the remaining frame structure.

According to a second aspect of the present invention there is provided a method of repairing a vehicle frame structure having one or more wholly or substantially vertical pillars and one or more wholly or substantially horizontal interconnected struts, the bottom section of a least one of the vertical pillars being separable from the remaining section of that pillar, wherein the bottom section is released and removed from the frame structure, and a new bottom section is secured to the frame structure.

BRIEF DESCRIPTION OF THE SEVERAL VIEWS OF THE DRAWINGS

An embodiment of the present invention will now be described by way of example only and with reference to the accompanying diagrammatic drawings in which.

DETAILED DESCRIPTION OF THE INVENTION

Figure 1:
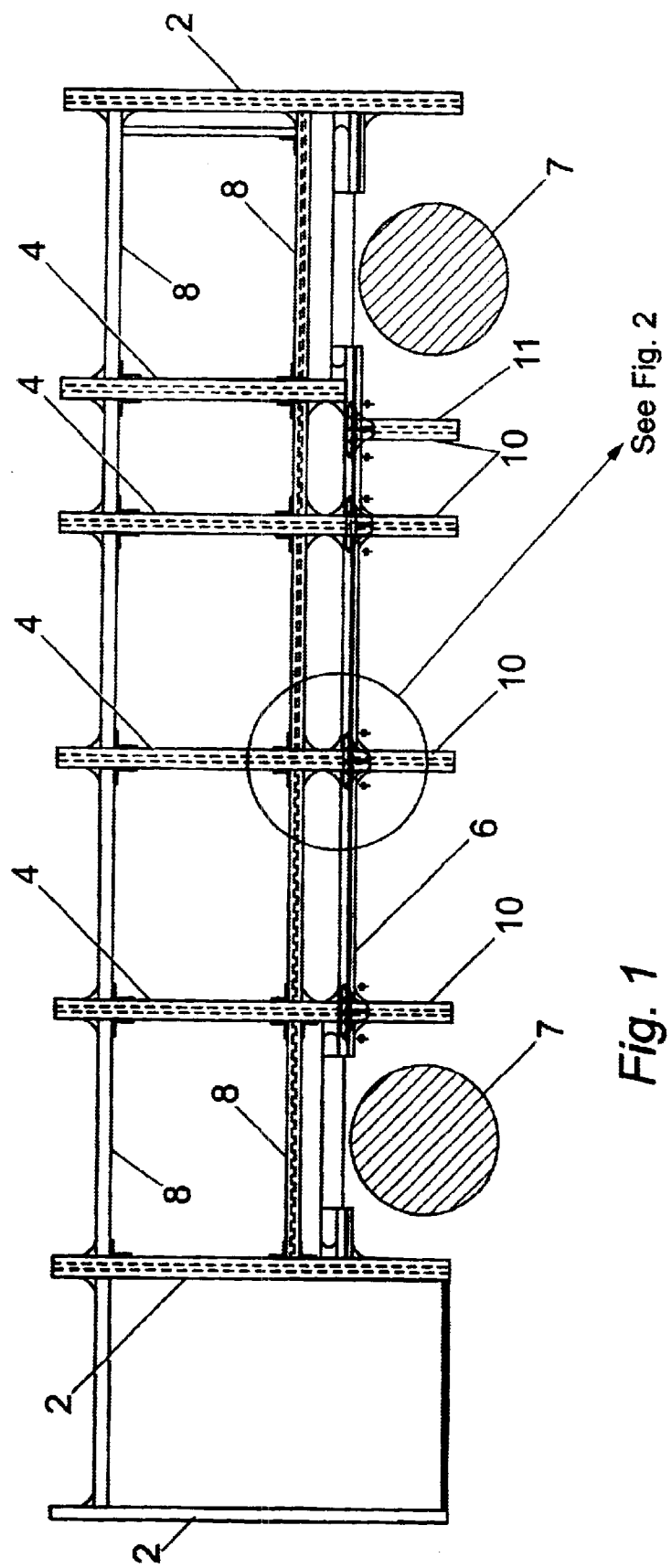
FIG. 1 is a side view of a bus side-panel frame structure according to the present invention.

Referring to the drawings, FIG. 1 shows a bus low floor side-panel frame structure having seven vertical pillars and three horizontal struts. Three of the vertical pillars (2) are continuous from the top to the bottom of the structure. The remaining four pillars (4) extend from the top of the structure to the level of the lowest horizontal strut or stringer (6).

The lowest horizontal strut (6) is continuous between the wheel arches of the frame structure. The position of the wheels of the bus are shown figuratively (7). The remaining two sets of horizontal struts (8) are intermediate the vertical pillars (2,4).

Extending beneath the lowest horizontal strut (6) are the bottom sections or stumps (10) of the shorter vertical pillars (4). The rearmost bottom section (11) is off-set from the line of its pillar (4) thereabove, in order to provide sufficient wheel arch space.

Figure 2:
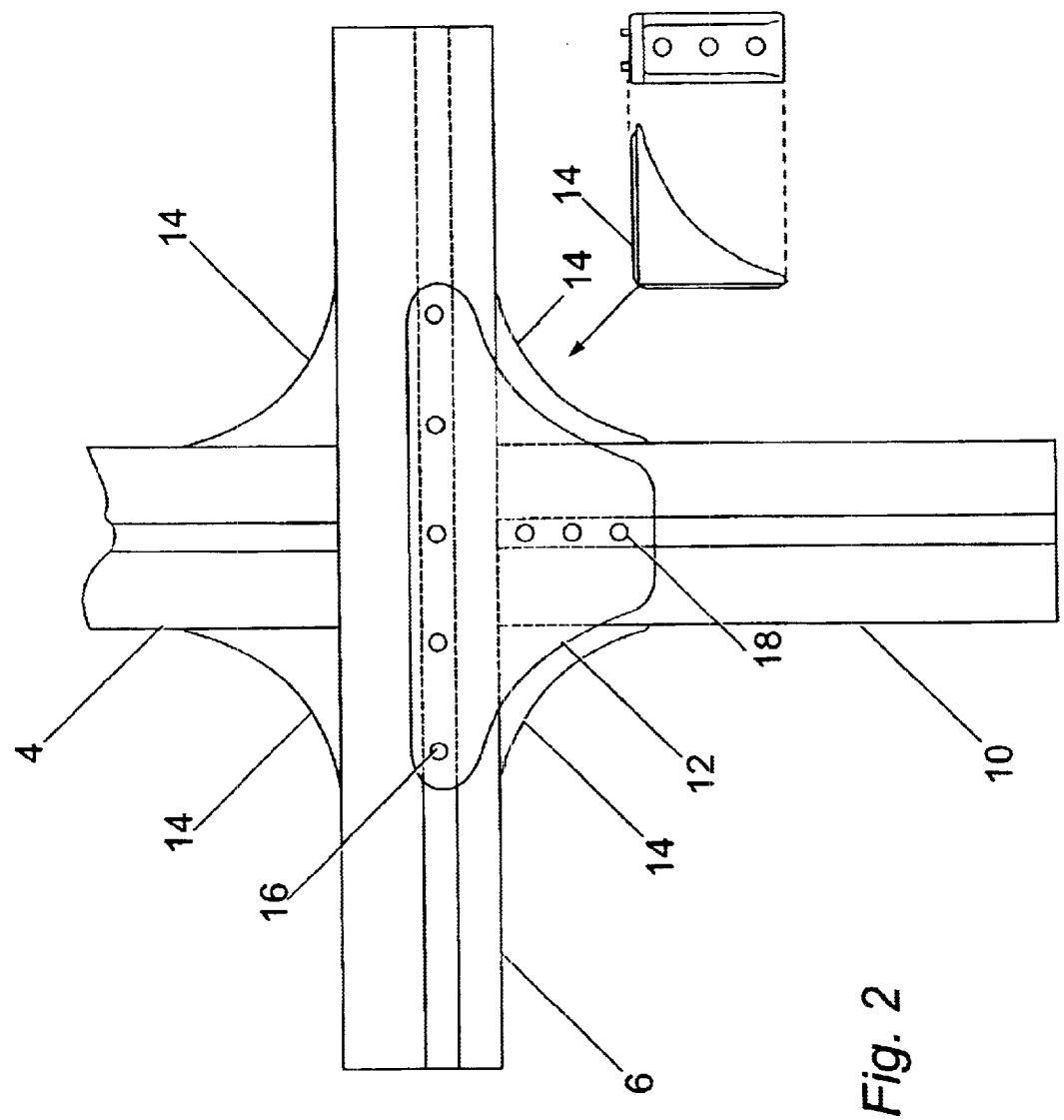
FIG. 2 is an enlarged view of one of the frame intersections of the panel in FIG. 1.

As shown in more detail in FIG. 2, each bottom section (10) is removably secured to the lowest horizontal strut (6) using a reinforcement plate (12), and four angle brackets (14), one of which is shown separately and shown attached. The steel plate (12) is secured to the lowest horizontal strut (6) using five bolts and nuts through five aligned apertures (16), and secured to each bottom section (10) using similar bolts and nuts through three aligned apertures (18). The angle brackets (14) are locatable in the four corners between the pillar sections (4,10) and the lowest horizontal strut (6) as shown.

Each plate could be formed from 5 mm steel which may be zinc plated. The form, shape and material of the pillars and struts corresponds to those known in the art.

In use, it is assumed that an accident has caused damage to the side of a bus between its wheels, and at a level of a normal car bumper. This level is below the level of the lowest horizontal strut (6). In the accident, not only will the outer bus panel(s) have been damaged, but one or more of the bottom pillar sections (10).

To repair this, the outer bus panel is removed in a known manner, and the damaged bottom pillar section (10) can be easily and quickly unbolted from the lowest horizontal strut (6) by removal of the plates and lower angle brackets. New bottom pillar sections can then be added and secured in place by using the same bolts.

Tests have been carried out on a side-panel frame structure made for a bus. The frame structure was tested for fatigue, and the spliced bottom pillar section cleared tests for the equivalent life-time required for a bus frame structure. Moreover, it was found that the spliced bottom section of the present invention increased the strength of the bottom of the pillar in comparison with a welded repaired bottom section as hitherto used.

The present invention provides a frame structure for low floor passenger service vehicles, especially those having extended lower panels and more commonly involved in accidents, which allows the frame structure to be quickly and easily repaired using standard pieces and tools. The vehicle can therefore be back in use more quickly than before, and specialist repair work and specialist repair equipment is not required.

What is claimed is:

1. A vehicle frame structure having one or more wholly or substantially vertical pillars, and one or more wholly or substantially horizontal interconnected struts, wherein a separable bottom section of at least one of the vertical pillars being separable from a remaining section of that pillar, and the separable bottom section is securable to the lowest horizontal strut through one or more intermediate securing means comprising one or more reinforcement plates and one or more angle brackets attachable to both the separable bottom section and the horizontal strut, and wherein the frame structure is for a low floor passenger service vehicle.

2. A vehicle frame structure as claimed in claim 1 wherein the separable bottom section is secured to the lowest horizontal strut using nuts and bolts.

3. A vehicle frame structure as claimed in claim 1 wherein one or more of the separable bottom sections are not aligned with one or more of the vertical pillars.

4. A vehicle frame structure as claimed in claim 1 wherein the frame structure includes one or more continuous vertical pillars.

5. A vehicle frame structure as claimed in claim 1 being a side-frame structure.

6. A method of repairing a vehicle frame structure having one or more wholly or substantially vertical pillars and one or more wholly or substantially horizontal interconnected struts, a separable bottom section of at least one of the vertical pillars being separable from a remaining section of that pillar, and the separable bottom section being securable to lowest horizontal strut through one or more intermediate securing means comprising one or more reinforcement plates and one or more angle brackets attachable to both the separable bottom section and the lowest horizontal strut, wherein the bottom section is released by detachment of the plate and bracket and removed from the frame structure, and a new bottom section is secured to the frame structure by reattachment of the plate and bracket, and wherein the frame structure is a low floor passenger service vehicle frame structure.

* * * * *